(12) United States Patent
Kim et al.

(10) Patent No.: US 11,979,252 B2
(45) Date of Patent: *May 7, 2024

(54) METHOD AND APPARATUS FOR PROVIDING REMOTE USER INTERFACE SERVICES

(71) Applicant: SAMSUNG ELECTRONICS CO., LTD., Suwon-si (KR)

(72) Inventors: Hwa-jung Kim, Suwon-si (KR); Ho Jin, Yongin-si (KR); Young-chul Sohn, Seoul (KR); Soo-min Shin, Seoul (KR); Min-jeong Moon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,449

(22) Filed: Jun. 24, 2022

(65) Prior Publication Data

US 2022/0321377 A1   Oct. 6, 2022

Related U.S. Application Data

(63) Continuation of application No. 17/200,054, filed on Mar. 12, 2021, now Pat. No. 11,381,415, which is a
(Continued)

(30) Foreign Application Priority Data

Nov. 13, 2009   (KR) ........................ 10-2009-0109695

(51) Int. Cl.
*H04L 12/28*   (2006.01)
*H04L 51/18*   (2022.01)
(Continued)

(52) U.S. Cl.
CPC .......... *H04L 12/2814* (2013.01); *H04L 51/18* (2013.01); *H04L 51/58* (2022.05);
(Continued)

(58) Field of Classification Search
CPC ................ G08C 17/02; G08C 2201/93; G08C 2201/41; G08C 2201/30; G08C 2201/33;
(Continued)

(56) References Cited

U.S. PATENT DOCUMENTS 5,880,732 A   3/1999   Tryding
5,959,543 A   9/1999   LaPorta et al.
(Continued)

FOREIGN PATENT DOCUMENTS

CN   1842103 A   10/2006
EP   1 069 500 A1   1/2001
(Continued)

OTHER PUBLICATIONS

Communication dated Jan. 9, 2018, from the Japanese Patent Office in counterpart application No. 2017-020166.
(Continued)

*Primary Examiner* — Greg C Bengzon
(74) *Attorney, Agent, or Firm* — Sughrue Mion, PLLC

(57) ABSTRACT

First electronic device includes a communication interface and a processor. The processor is configured to: receive, from the second electronic device, an incoming message destined for the first electronic device, transmit, to the third electronic device, message information related to the incoming message, the message information being used for displaying the incoming message on the third electronic device, transmit preset texts to the third electronic device, the preset texts being stored in the first electronic device to be used for replying to messages receivable by the first electronic device, based on one of the preset texts being selected by a
(Continued)

user input among the preset texts displayed on the third electronic device, receive response information from the third electronic device, the response information being related to the one of the preset texts, and transmit, to the second electronic device, a response message including the one of the preset texts.

15 Claims, 8 Drawing Sheets

Related U.S. Application Data continuation of application No. 16/585,334, filed on Sep. 27, 2019, now Pat. No. 10,951,432, which is a continuation of application No. 14/819,094, filed on Aug. 5, 2015, now Pat. No. 10,454,701, which is a continuation of application No. 12/770,226, filed on Apr. 29, 2010, now abandoned.

(51) Int. Cl.
| | | |
|---|---|---|
| *H04L 51/58* | (2022.01) | |
| *H04L 67/10* | (2022.01) | |
| *H04W 4/14* | (2009.01) | |
| *H04L 67/04* | (2022.01) | |
| *H04L 67/06* | (2022.01) | |

(52) U.S. Cl.
CPC .............. *H04L 67/10* (2013.01); *H04W 4/14* (2013.01); *G08C 2201/41* (2013.01); *H04L 67/04* (2013.01); *H04L 67/06* (2013.01)

(58) Field of Classification Search
CPC ............ G08C 2201/50; G08C 2201/51; G08C 2201/92; G08C 2201/90; H04M 1/6041; H04M 1/6058; H04M 1/6066; H04M 1/6075; H04M 1/6083; H04M 1/6091; H04M 1/006; G06F 15/16; G06F 3/0484; G06F 3/0481; G06F 3/0482; G06F 3/1454; G06F 3/048; G06F 3/04817; G06F 3/04842; G06F 3/14; G06F 3/1462; G06F 8/60; G06F 9/44526; G06F 9/541; G06F 9/542; G06F 9/543; G06F 9/546; G09G 2370/04; G09G 2370/06; H04N 21/4788; H04N 7/17318; H04N 21/4782; H04N 21/6125; H04N 21/4786; H04N 21/435; H04N 21/4622; H04N 21/4882; H04N 21/235; H04N 21/43615; H04N 21/6581; H04N 21/8173; H04N 21/4755; H04N 21/478; H04N 21/4826; H04N 21/64322; H04N 7/147; H04N 21/254; H04N 21/2747; H04N 21/41407; H04N 21/4223; H04N 21/4227; H04N 21/431; H04N 21/4316; H04N 21/44222; H04N 21/4753; H04N 21/482; H04N 21/485; H04N 21/84; H04N 7/173; H04N 21/2408; H04N 21/2665; H04N 21/4126; H04N 21/4147; H04N 21/4331; H04N 21/441; H04N 21/4438; H04N 21/454; H04N 21/4621; H04N 21/4668; H04N 21/4722; H04N 21/4751; H04N 21/4858; H04N 21/488; H04N 21/6175; H04N 21/632; H04N 21/8193; H04N 21/858; H04N 5/445; H04N 7/17309; H04N 17/004; H04N 21/21; H04N 21/23; H04N 21/234336; H04N 21/237; H04N 21/24; H04N 21/25825; H04N 21/25833; H04N 21/25875; H04N 21/27; H04N 21/422; H04N 21/42209; H04N 21/4221; H04N 21/42222; H04N 21/4383; H04N 21/44008; H04N 21/442; H04N 21/466; H04N 21/472; H04N 21/47214; H04N 21/6131; H04N 21/6181; H04N 21/6187; H04N 21/8358; H04N 21/8456; H04N 5/765; H04N 7/106; H04N 21/42204; H04N 21/4131; H04N 21/47; H04N 21/475; H04W 4/14; H04W 4/12; H04W 4/20; H04W 92/02; H04W 4/16; H04W 4/18; H04W 80/00; H04W 88/184; H04W 8/22; H04L 67/02; H04L 12/2809; H04L 12/282; H04L 2012/2849; H04L 12/2818; H04L 51/04; H04L 61/106; H04L 65/1083; H04L 67/025; H04L 67/04; H04L 12/2803; H04L 12/2814; H04L 12/2827; H04L 12/66; H04L 51/10; H04L 12/1827; H04L 12/1859; H04L 12/2805; H04L 12/281; H04L 12/2825; H04L 12/2832; H04L 12/40117; H04L 2012/2841; H04L 67/125; H04L 67/14; H04L 67/148; H04L 67/306; H04L 69/329; H04L 51/18; H04L 67/06; H04L 67/10; G06Q 50/01; H04H 20/28; H04H 20/38; H04H 2201/70; H04H 60/52; H04H 60/80
See application file for complete search history.

(56) References Cited

U.S. PATENT DOCUMENTS

| | | | |
|---|---|---|---|
| 5,960,367 A | 9/1999 | Kita | |
| 5,974,300 A | 10/1999 | LaPorta et al. | |
| 6,014,429 A | 1/2000 | LaPorta et al. | |
| 6,044,134 A * | 3/2000 | De La Huerga | H04M 3/53333 379/88.08 |
| 6,181,326 B1 | 1/2001 | Takahashi | |
| 6,292,668 B1 * | 9/2001 | Alanara | H04M 1/72469 455/552.1 |
| 6,529,744 B1 * | 3/2003 | Birkler | H04M 1/72409 455/420 |
| 6,724,872 B1 * | 4/2004 | Moore | H04M 3/436 379/215.01 |
| 6,870,910 B1 * | 3/2005 | Armstrong | H04M 3/42153 379/218.01 |
| 7,010,312 B1 | 3/2006 | Zechlin | |
| 7,039,393 B1 | 5/2006 | Kite | |
| 7,061,470 B1 | 6/2006 | Sharp | |
| 7,076,057 B1 | 7/2006 | Sharp | |
| 7,092,370 B2 * | 8/2006 | Jiang | H04L 67/55 455/450 |
| 7,120,474 B1 | 10/2006 | Sharp | |
| 7,215,975 B1 | 5/2007 | Sharp | |
| 7,251,318 B1 | 7/2007 | Henderson | |
| 7,313,389 B1 | 12/2007 | Sharp et al. | |
| 7,328,031 B2 * | 2/2008 | Kraft | H04W 4/06 455/550.1 |
| 7,437,179 B1 | 10/2008 | Sharp | |
| 7,487,248 B2 * | 2/2009 | Moran | H04L 67/14 709/227 |
| 7,519,681 B2 | 4/2009 | Edwards et al. | |
| 7,571,458 B1 | 8/2009 | Eyal | |
| 7,577,910 B1 | 8/2009 | Husemann et al. | |
| 7,605,801 B1 | 10/2009 | Sharp | |
| 7,627,642 B1 * | 12/2009 | Horstmann | G06Q 10/107 709/208 |
| 7,689,649 B2 * | 3/2010 | Heikes | G06Q 10/107 709/219 |
| 7,793,233 B1 | 9/2010 | Sellers et al. | |
| 7,822,188 B1 * | 10/2010 | Kirchhoff | H04L 65/1096 379/211.02 |

(56) References Cited

U.S. PATENT DOCUMENTS

| | | | |
|---|---|---|---|
| 7,889,185 B2 | 2/2011 | Blumenberg et al. | |
| 7,912,972 B2 | 3/2011 | Park et al. | |
| 8,089,503 B2 | 1/2012 | Bruce et al. | |
| 8,150,387 B2 | 4/2012 | Klein et al. | |
| 8,181,226 B2 | 5/2012 | Lohr | |
| 8,185,139 B1 | 5/2012 | Mangal | |
| 8,195,243 B2 | 6/2012 | Kim et al. | |
| 8,201,196 B2 | 6/2012 | Michael et al. | |
| 8,243,636 B2 | 8/2012 | Myllynen et al. | |
| 8,266,664 B2 | 9/2012 | Qiu et al. | |
| 8,295,865 B1 | 10/2012 | Kirchhoff et al. | |
| 8,316,308 B2 | 11/2012 | Sherman et al. | |
| 8,332,475 B2 | 12/2012 | Rosen | |
| 8,341,681 B2 | 12/2012 | Walter et al. | |
| 8,350,887 B2 | 1/2013 | Bruce et al. | |
| 8,352,544 B2 | 1/2013 | Fang et al. | |
| 8,359,014 B2 | 1/2013 | Olincy et al. | |
| 8,385,975 B2 | 2/2013 | Forutanpour et al. | |
| 8,498,657 B1 | 7/2013 | Delker et al. | |
| 8,504,637 B2 | 8/2013 | Kim et al. | |
| 8,543,161 B2 | 9/2013 | Spalink | |
| 8,543,927 B1* | 9/2013 | McKinley | H04M 1/72436 |
| | | | 715/753 |
| 8,626,829 B2* | 1/2014 | Franco | H04L 9/40 |
| | | | 455/414.1 |
| 8,630,625 B2 | 1/2014 | Bi et al. | |
| 8,738,047 B2 | 5/2014 | Choi et al. | |
| 8,751,938 B2* | 6/2014 | Conley | H04N 1/0035 |
| | | | 715/740 |
| 8,813,112 B1 | 8/2014 | Cibula et al. | |
| 8,874,677 B2* | 10/2014 | Rosen | H04M 1/72448 |
| | | | 709/206 |
| 8,971,860 B1 | 3/2015 | Olincy et al. | |
| 8,977,255 B2 | 3/2015 | Freeman et al. | |
| 8,983,551 B2 | 3/2015 | Worick | |
| 9,071,945 B1 | 6/2015 | Rubin et al. | |
| 9,100,807 B2 | 8/2015 | Rosen | |
| 9,154,606 B2 | 10/2015 | Tseng et al. | |
| 9,176,651 B2 | 11/2015 | Schubert et al. | |
| 9,185,212 B2 | 11/2015 | Soo et al. | |
| 9,204,423 B2 | 12/2015 | Kim et al. | |
| 9,225,524 B2 | 12/2015 | Singh et al. | |
| 9,225,540 B2 | 12/2015 | Jung et al. | |
| 9,285,968 B2 | 3/2016 | Schubert et al. | |
| 9,577,968 B2 | 2/2017 | Rosen | |
| 9,614,809 B2 | 4/2017 | Rosen | |
| 9,620,001 B2 | 4/2017 | Brunolli | |
| 9,628,432 B2 | 4/2017 | Rosen et al. | |
| 9,665,242 B2* | 5/2017 | Kim | G06F 3/04842 |
| 9,686,145 B2 | 6/2017 | Sherman et al. | |
| 9,692,865 B2 | 6/2017 | Youn et al. | |
| 9,733,804 B2 | 8/2017 | Huang et al. | |
| 9,756,170 B2 | 9/2017 | Liu et al. | |
| 10,354,518 B2 | 7/2019 | Brunolli | |
| 10,454,701 B2 | 10/2019 | Kim et al. | |
| 2001/0031633 A1 | 10/2001 | Tuomela et al. | |
| 2001/0043514 A1 | 11/2001 | Kita | |
| 2002/0115478 A1 | 8/2002 | Fujisawa et al. | |
| 2002/0144273 A1 | 10/2002 | Reto | |
| 2003/0043787 A1* | 3/2003 | Emerson, III | H04M 7/0003 |
| | | | 379/900 |
| 2003/0048381 A1 | 3/2003 | Glatt | |
| 2003/0051083 A1 | 3/2003 | Striemer | |
| 2003/0064716 A1 | 4/2003 | Gailey | |
| 2003/0095521 A1 | 5/2003 | Haller et al. | |
| 2003/0103088 A1 | 6/2003 | Dresti et al. | |
| 2003/0123634 A1* | 7/2003 | Chee | H04L 67/535 |
| | | | 379/88.22 |
| 2003/0140343 A1 | 7/2003 | Falvo et al. | |
| 2003/0154256 A1 | 8/2003 | Hadano et al. | |
| 2003/0154446 A1* | 8/2003 | Constant | H04L 51/58 |
| | | | 715/256 |
| 2003/0195814 A1 | 10/2003 | Striemer | |
| 2003/0226143 A1 | 12/2003 | Michael et al. | |
| 2003/0232593 A1 | 12/2003 | Wahlroos et al. | |
| 2004/0075698 A1 | 4/2004 | Gao et al. | |
| 2004/0103032 A1 | 5/2004 | Maggio | |
| 2004/0117821 A1 | 6/2004 | Karaoguz et al. | |
| 2004/0130580 A1 | 7/2004 | Howard et al. | |
| 2004/0130581 A1 | 7/2004 | Howard et al. | |
| 2004/0185915 A1* | 9/2004 | Ihara | H04M 1/6066 |
| | | | 455/569.1 |
| 2004/0203794 A1 | 10/2004 | Brown et al. | |
| 2004/0209614 A1 | 10/2004 | Bright et al. | |
| 2004/0214568 A1 | 10/2004 | Anderson | |
| 2004/0230659 A1 | 11/2004 | Chase | |
| 2005/0123118 A1* | 6/2005 | Terry | H04M 3/436 |
| | | | 379/211.02 |
| 2005/0153729 A1 | 7/2005 | Logan et al. | |
| 2005/0163108 A1 | 7/2005 | Moore et al. | |
| 2005/0170869 A1 | 8/2005 | Slemmer et al. | |
| 2005/0221771 A1 | 10/2005 | Himeno | |
| 2005/0222933 A1 | 10/2005 | Wesby | |
| 2005/0228887 A1 | 10/2005 | Wang et al. | |
| 2005/0237308 A1 | 10/2005 | Autio et al. | |
| 2005/0261034 A1 | 11/2005 | Punaganti et al. | |
| 2005/0266793 A1 | 12/2005 | Grossman et al. | |
| 2005/0268003 A1 | 12/2005 | Wang et al. | |
| 2005/0272408 A1* | 12/2005 | Wilkes-Gibbs | H04M 1/72457 |
| | | | 455/412.2 |
| 2005/0278750 A1 | 12/2005 | Grossman et al. | |
| 2005/0285934 A1 | 12/2005 | Carter | |
| 2006/0009243 A1 | 1/2006 | Dahan et al. | |
| 2006/0026088 A1 | 2/2006 | Grossman et al. | |
| 2006/0028582 A1* | 2/2006 | Zahn | H04N 21/41265 |
| | | | 348/E5.103 |
| 2006/0036672 A1 | 2/2006 | Cha et al. | |
| 2006/0041615 A1 | 2/2006 | Blank et al. | |
| 2006/0062172 A1 | 3/2006 | Grossman et al. | |
| 2006/0073816 A1 | 4/2006 | Kim et al. | |
| 2006/0080704 A1 | 4/2006 | Le Huerou et al. | |
| 2006/0092037 A1 | 5/2006 | Neogi et al. | |
| 2006/0098634 A1 | 5/2006 | Umemoto et al. | |
| 2006/0098650 A1 | 5/2006 | Beninato et al. | |
| 2006/0149818 A1 | 6/2006 | Odell et al. | |
| 2006/0165092 A1 | 7/2006 | Wilson et al. | |
| 2006/0179118 A1 | 8/2006 | Stirbu | |
| 2006/0206833 A1* | 9/2006 | Capper | H04M 1/72412 |
| | | | 715/205 |
| 2006/0212519 A1 | 9/2006 | Kelly et al. | |
| 2006/0225108 A1 | 10/2006 | Tabassi et al. | |
| 2006/0253330 A1 | 11/2006 | Maggio et al. | |
| 2006/0257840 A1* | 11/2006 | Risch | G06Q 30/02 |
| | | | 434/323 |
| 2007/0026798 A1 | 2/2007 | Hoogstra | |
| 2007/0042812 A1 | 2/2007 | Basir | |
| 2007/0060054 A1 | 3/2007 | Romesburg | |
| 2007/0079345 A1 | 4/2007 | McEnroe | |
| 2007/0080931 A1 | 4/2007 | Chen et al. | |
| 2007/0080933 A1 | 4/2007 | Chen et al. | |
| 2007/0080934 A1 | 4/2007 | Chen et al. | |
| 2007/0087790 A1 | 4/2007 | Worick | |
| 2007/0089055 A1 | 4/2007 | Ko et al. | |
| 2007/0089158 A1 | 4/2007 | Clark | |
| 2007/0100948 A1 | 5/2007 | Adams et al. | |
| 2007/0162930 A1 | 7/2007 | Mickle et al. | |
| 2007/0165554 A1 | 7/2007 | Jefferson et al. | |
| 2007/0207782 A1 | 9/2007 | Tran | |
| 2007/0236613 A1* | 10/2007 | Foss | H04N 21/42204 |
| | | | 348/734 |
| 2007/0236615 A1 | 10/2007 | Tanaka et al. | |
| 2007/0265006 A1* | 11/2007 | Washok | G06Q 30/02 |
| | | | 455/435.1 |
| 2007/0281759 A1 | 12/2007 | Choi | |
| 2007/0288576 A1* | 12/2007 | Illg | G06Q 10/107 |
| | | | 709/206 |
| 2007/0293206 A1 | 12/2007 | Lund | |
| 2007/0298770 A1* | 12/2007 | Lee | H04W 4/12 |
| | | | 455/412.2 |
| 2008/0014869 A1 | 1/2008 | Demirbasa et al. | |
| 2008/0034081 A1 | 2/2008 | Marshall et al. | |
| 2008/0052347 A1 | 2/2008 | Jung et al. | |

(56) References Cited

U.S. PATENT DOCUMENTS

| | | |
|---|---|---|
| 2008/0077468 A1* | 3/2008 | Raskin .............. G06Q 30/0203 705/7.32 |
| 2008/0085675 A1* | 4/2008 | Rao ...................... G06Q 30/02 455/2.01 |
| 2008/0092199 A1 | 4/2008 | McCarthy et al. |
| 2008/0114845 A1* | 5/2008 | Rao ...................... H04L 67/303 709/206 |
| 2008/0133671 A1* | 6/2008 | Kalaboukis ............ H04L 51/00 709/206 |
| 2008/0147803 A1* | 6/2008 | Krzyzanowski ... H04N 21/4788 709/206 |
| 2008/0180228 A1 | 7/2008 | Wakefield et al. |
| 2008/0232336 A1 | 9/2008 | Elkady et al. |
| 2008/0233932 A1 | 9/2008 | Sapp |
| 2008/0244681 A1 | 10/2008 | Gossweiler et al. |
| 2008/0246733 A1 | 10/2008 | Henty |
| 2008/0259829 A1 | 10/2008 | Rosenblatt |
| 2008/0261564 A1 | 10/2008 | Logan |
| 2008/0263158 A1 | 10/2008 | Del Cacho |
| 2008/0274743 A1 | 11/2008 | Kim |
| 2008/0281926 A1 | 11/2008 | Walter et al. |
| 2008/0288600 A1 | 11/2008 | Clark |
| 2008/0288618 A1 | 11/2008 | Vardi et al. |
| 2008/0305742 A1 | 12/2008 | Basir |
| 2008/0305815 A1 | 12/2008 | McDonough |
| 2008/0307315 A1 | 12/2008 | Sherman et al. |
| 2008/0313050 A1 | 12/2008 | Basir |
| 2009/0037385 A1 | 2/2009 | Min et al. |
| 2009/0044216 A1 | 2/2009 | McNicoll |
| 2009/0044252 A1* | 2/2009 | Kashima ............... H04L 51/214 709/206 |
| 2009/0051649 A1 | 2/2009 | Rondel |
| 2009/0061943 A1* | 3/2009 | Kamgaing-Kouam ...................... H04M 1/72445 455/566 |
| 2009/0088207 A1* | 4/2009 | Sweeney ............ H04W 68/005 455/557 |
| 2009/0125598 A1* | 5/2009 | Sun ...................... H04L 51/043 709/206 |
| 2009/0138564 A1 | 5/2009 | Beddus |
| 2009/0144378 A1 | 6/2009 | Cassanova et al. |
| 2009/0144379 A1 | 6/2009 | Cassanova et al. |
| 2009/0150903 A1 | 6/2009 | Cassanova et al. |
| 2009/0156170 A1 | 6/2009 | Rossano et al. |
| 2009/0157886 A1 | 6/2009 | Lee et al. |
| 2009/0158136 A1 | 6/2009 | Rossano et al. |
| 2009/0160694 A1 | 6/2009 | Di Flora |
| 2009/0164914 A1 | 6/2009 | Chen |
| 2009/0178078 A1 | 7/2009 | Daigle et al. |
| 2009/0187620 A1 | 7/2009 | Kisel et al. |
| 2009/0189971 A1 | 7/2009 | Yoder |
| 2009/0217365 A1 | 8/2009 | Daigle |
| 2009/0235317 A1 | 9/2009 | Igarashi |
| 2009/0239528 A1 | 9/2009 | Ryley et al. |
| 2009/0248883 A1* | 10/2009 | Suryanarayana ....... G06F 9/451 709/229 |
| 2009/0248913 A1* | 10/2009 | Salokannel ............ G06Q 30/02 710/33 |
| 2009/0251526 A1 | 10/2009 | Book |
| 2009/0262088 A1 | 10/2009 | Moll-Carrillo et al. |
| 2009/0264070 A1 | 10/2009 | Lim |
| 2009/0264140 A1 | 10/2009 | Bain |
| 2009/0289917 A1 | 11/2009 | Saunders |
| 2009/0325609 A1 | 12/2009 | Rosen |
| 2009/0327910 A1 | 12/2009 | Black et al. |
| 2009/0328118 A1 | 12/2009 | Ravishankar et al. |
| 2010/0035594 A1* | 2/2010 | Vendrow ........... H04M 3/53308 455/417 |
| 2010/0035640 A1 | 2/2010 | Lew et al. |
| 2010/0041424 A1 | 2/2010 | Osborn |
| 2010/0042692 A1 | 2/2010 | Irwin et al. |
| 2010/0057882 A1 | 3/2010 | Haartsen et al. |
| 2010/0064333 A1 | 3/2010 | Blackburn et al. |
| 2010/0066677 A1 | 3/2010 | Garrett et al. |
| 2010/0071053 A1 | 3/2010 | Ansari et al. |
| 2010/0087172 A1 | 4/2010 | Klassen et al. |
| 2010/0095332 A1 | 4/2010 | Gran et al. |
| 2010/0097239 A1* | 4/2010 | Campbell ........... H04M 1/6083 455/466 |
| 2010/0138503 A1* | 6/2010 | Ishikawa ............ H04L 12/1813 709/206 |
| 2010/0159967 A1* | 6/2010 | Pounds .................. H04L 67/55 709/206 |
| 2010/0179991 A1 | 7/2010 | Lorch et al. |
| 2010/0182994 A1 | 7/2010 | Rahman et al. |
| 2010/0205539 A1* | 8/2010 | Gestsson ........... H04M 3/42365 715/752 |
| 2010/0222102 A1 | 9/2010 | Rodriguez |
| 2010/0227631 A1 | 9/2010 | Bolton et al. |
| 2010/0251134 A1* | 9/2010 | Van Seggelen ........ G01C 21/26 709/204 |
| 2010/0268828 A1 | 10/2010 | Pahlavan et al. |
| 2010/0269057 A1 | 10/2010 | Pahlavan et al. |
| 2010/0278345 A1 | 11/2010 | Alsina et al. |
| 2010/0285775 A1 | 11/2010 | Klein et al. |
| 2010/0287241 A1 | 11/2010 | Swanburg et al. |
| 2010/0293462 A1 | 11/2010 | Bull et al. |
| 2010/0298012 A1* | 11/2010 | Damarla ................. H04L 51/58 455/466 |
| 2010/0311443 A1* | 12/2010 | Abuelsaad ........... G06Q 10/107 455/466 |
| 2010/0312769 A1 | 12/2010 | Bailey et al. |
| 2010/0317332 A1 | 12/2010 | Bathiche et al. |
| 2010/0330975 A1 | 12/2010 | Basir |
| 2010/0332984 A1 | 12/2010 | Tzruya |
| 2011/0040838 A1* | 2/2011 | Damarla ................. H04L 51/58 709/206 |
| 2011/0047487 A1 | 2/2011 | DeWeese et al. |
| 2011/0059769 A1* | 3/2011 | Brunolli ............ H04M 1/72448 455/556.1 |
| 2011/0067059 A1 | 3/2011 | Johnston et al. |
| 2011/0072477 A1 | 3/2011 | Foti et al. |
| 2011/0074794 A1 | 3/2011 | Felt et al. |
| 2011/0081007 A1 | 4/2011 | Bar-Yoav |
| 2011/0111741 A1 | 5/2011 | Connors et al. |
| 2011/0151851 A1 | 6/2011 | Foley |
| 2011/0167359 A1 | 7/2011 | Weisberg |
| 2011/0179129 A1 | 7/2011 | McKissick et al. |
| 2011/0238766 A1 | 9/2011 | Lew et al. |
| 2011/0265003 A1 | 10/2011 | Schubert et al. |
| 2011/0314134 A1 | 12/2011 | Foti |
| 2012/0021784 A1 | 1/2012 | Meunier et al. |
| 2012/0072996 A1 | 3/2012 | Svendsen et al. |
| 2012/0077518 A1 | 3/2012 | Logan |
| 2012/0159546 A1 | 6/2012 | Klein et al. |
| 2012/0274508 A1* | 11/2012 | Brown ................ A63B 24/0062 342/357.57 |
| 2012/0315880 A1* | 12/2012 | Peitrow ............. H04M 1/72513 455/412.1 |
| 2013/0051538 A1 | 2/2013 | Qiu et al. |
| 2013/0070044 A1 | 3/2013 | Naidoo et al. |
| 2013/0080553 A1 | 3/2013 | Rosen |
| 2013/0110955 A1 | 5/2013 | Brady et al. |
| 2013/0150004 A1 | 6/2013 | Rosen |
| 2013/0238165 A1 | 9/2013 | Garrett et al. |
| 2013/0244708 A1 | 9/2013 | Andrus et al. |
| 2013/0252646 A1* | 9/2013 | Jang ....................... H04L 51/58 455/466 |
| 2014/0033059 A1 | 1/2014 | Schubert et al. |
| 2014/0057610 A1 | 2/2014 | Olincy et al. |
| 2014/0208223 A1 | 7/2014 | Schubert et al. |
| 2014/0267020 A1 | 9/2014 | Ishibashi |
| 2014/0359003 A1 | 12/2014 | Sullad et al. |
| 2014/0365362 A1 | 12/2014 | Dua |
| 2014/0378175 A1 | 12/2014 | Rosen |
| 2014/0379794 A1 | 12/2014 | Rosen |
| 2015/0040007 A1 | 2/2015 | Schubert et al. |
| 2015/0061862 A1 | 3/2015 | Lee |
| 2015/0143262 A1 | 5/2015 | Norwood et al. |
| 2015/0371306 A1 | 12/2015 | Besson |
| 2016/0036742 A1 | 2/2016 | Rosen |
| 2016/0036743 A1 | 2/2016 | Rosen |

(56) References Cited

U.S. PATENT DOCUMENTS

| | | | |
|---|---|---|---|
| 2016/0036744 | A1 | 2/2016 | Rosen |
| 2016/0036745 | A1 | 2/2016 | Rosen |
| 2016/0036746 | A1 | 2/2016 | Rosen |
| 2016/0269350 | A1 | 9/2016 | Rosen |
| 2016/0330154 | A1 | 11/2016 | Rosen |
| 2017/0041273 | A1 | 2/2017 | Marcellino |
| 2017/0213452 | A1 | 7/2017 | Brunolli |
| 2017/0235477 | A1 | 8/2017 | Sherman et al. |
| 2017/0243195 | A1 | 8/2017 | Xing |
| 2017/0289810 | A1 | 10/2017 | O'Meara et al. |

FOREIGN PATENT DOCUMENTS

| | | | |
|---|---|---|---|
| EP | 2474168 | A2 | 7/2012 |
| EP | 3082345 | A1 | 10/2016 |
| JP | 09-152924 | A | 6/1997 |
| JP | 9325992 | A | 12/1997 |
| JP | 2001-100972 | | 4/2001 |
| JP | 2002-175170 | A | 6/2002 |
| JP | 2002-535932 | A | 10/2002 |
| JP | 2002328872 | A | 11/2002 |
| JP | 2002344568 | A | 11/2002 |
| JP | 2003-234783 | A | 8/2003 |
| JP | 2008242827 | A | 10/2008 |
| JP | 2010-530572 | A | 9/2010 |
| JP | 2011514697 | A | 5/2011 |
| KR | 1020060015378 | A | 2/2006 |
| KR | 1020080038726 | A | 5/2008 |
| WO | 2007023494 | A2 | 3/2007 |
| WO | 2008/148222 | A1 | 12/2008 |
| WO | 2009/008578 | A1 | 1/2009 |
| WO | 2009092511 | A1 | 7/2009 |
| WO | 2011/029098 | A2 | 3/2011 |

OTHER PUBLICATIONS

Communication dated Feb. 13, 2018, from the State Intellectual Property Office of People's Republic of China in counterpart Application No. 201510479230.5.
Communication dated Jul. 3, 2017, from the European Patent Office in counterpart European Application No. 16191610.1.
Communication dated Dec. 2, 2016 issued by European Patent Office in counterpart European Patent Application No. 16191610.1.
Communication dated Dec. 15, 2016 issued by European Patent Office in counterpart European Patent Application No. 16 191 610.1.
Communication dated Sep. 6, 2016, issued by the Japanese Patent Office in counterpart Japanese Application No. 2015-160252.
Communication dated Feb. 18, 2016 issued by the Korean Intellectual Property Office in counterpart Korean Patent Application No. 10-2009-0109695.
"CEA Standard. Web-Based Protocol and Framework for Remote User Interface on UPNP Networks and the Internet (WEB4CE)"; Consumer Electronics Association; XP002431656; Jul. 2007; 194 pgs.
Communication dated Dec. 6, 2012, issued by the European Patent Office in counterpart European Patent Application No. 10830116.9.
Communication dated May 27, 2014 issued by the Japanese Patent Office in counterpart Japanese Patent Application No. 2010-235482.
Communication dated Nov. 15, 2014 issued by the State Intellectual Property Office of P.R. China in counterpart Chinese Patent Application No. 201010548480.7.
Communication dated Nov. 25, 2014 issued by the Japanese Patent Office in counterpart Japanese Patent Application No. 2010-235482.
Communication, dated Mar. 12, 2014, issued by the State Intellectual Property Office of P.R. China in counterpart Chinese Patent Application No. 201010548480.7.
International Search Report dated Jun. 27, 2011 from the International Searching Authority in counterpart international application No. PCT/KR2010/007170.
Office Action issued in parent U.S. Appl. No. 12/770,226 dated Apr. 12, 2017.
Office Action issued in parent U.S. Appl. No. 12/770,226 dated Aug. 30, 2016.
Office Action issued in parent U.S. Appl. No. 12/770,226 dated Oct. 20, 2015.
Office Action issued in parent U.S. Appl. No. 12/770,226 dated Apr. 7, 2015.
Office Action issued in parent U.S. Appl. No. 12/770,226 dated Jan. 10, 2014.
Office Action issued in parent U.S. Appl. No. 12/770,226 dated Aug. 14, 2012.
Office Action issued in parent U.S. Appl. No. 12/770,226 dated Nov. 17, 2016.
Office Action issued in parent U.S. Appl. No. 12/770,226 dated Apr. 5, 2016.
Office Action issued in parent U.S. Appl. No. 12/770,226 dated Jun. 20, 2014.
Office Action issued in parent U.S. Appl. No. 12/770,226 dated Jan. 25, 2013.
Non Final Office Action issued in U.S. Appl. No. 14/819,094 dated Nov. 7, 2016.
Non Final Office Action issued in U.S. Appl. No. 14/819,094 dated Nov. 28, 2017.
Non Final Office Action issued in U.S. Appl. No. 14/819,094 dated Nov. 3, 2015.
Office Action issued in U.S. Appl. No. 14/819,094 dated Nov. 15, 2018.
Office Action issued in U.S. Appl. No. 14/819,094 dated Apr. 18, 2016.
Office Action issued in U.S. Appl. No. 14/819,094 dated Apr. 3, 2017.
Office Action issued in U.S. Appl. No. 14/819,094 dated May 14. 2018.
Notice of Allowance issued in U.S. Appl. No. 14/819,094 dated Jun. 12, 2019.
Corrected Notice of Allowability issued in U.S. Appl. No. 14/819,094 dated Jun. 28, 2019.
Japanese Office Action dated May 27, 2014 in the Japanese Patent Application No. 2010-235482.
Notice of Allowance issued in U.S. Appl. No. 16/585,334 dated Nov. 10, 2020.

\* cited by examiner

METHOD AND APPARATUS FOR PROVIDING REMOTE USER INTERFACE SERVICES

CROSS-REFERENCE TO RELATED APPLICATIONS

This is a continuation of U.S. application Ser. No. 17/200,054, filed Mar. 12, 2021, which is a continuation of U.S. application Ser. No. 16/585,334 filed Sep. 27, 2019, now U.S. Pat. No. 10,951,432, issued Mar. 16, 2021, which is a continuation of U.S. application Ser. No. 14/819,094 filed Aug. 5, 2015, now U.S. Pat. No. 10,454,701, issued Oct. 22, 2019, which is a continuation application of U.S. application Ser. No. 12/770,226 filed Apr. 29, 2010, which claims priority from Korean Patent Application No. 10-2009-0109695, filed Nov. 13, 2009, in the Korean Intellectual Property Office. The disclosures of the above-named applications are incorporated by reference herein in their entireties.

BACKGROUND

1. Field

Apparatuses and methods consistent with the exemplary embodiments relate to providing a remote user interface (UI) service, and more particularly, to a method and an apparatus for providing a remote UI service, such as Multimedia Messaging Service (MMS) and Simple Message Service (SMS), for controlling message-related functions of a remote UI server device, by using a remote UI client device.

2. Description of the Related Art

Mobile devices, such as cellular phones, perform communications services, such as telephone calls and message exchange, between other devices, by using communication technologies including global system for mobile communication (GSM) and code division multiple access (CDMA).

A mobile device performs various controls, such as connection or termination of telephone calls and confirming, forwarding, or replying to messages, via a user interface (UI) embodied in the mobile device.

Meanwhile, a mobile device may be remote-controlled by a control device within a home network by transmitting commands according to a predetermined protocol to the mobile device using home network technology. In this case, new functions according to the predetermined protocol should be embodied in the control device and the mobile device.

SUMMARY OF THE EXEMPLARY EMBODIMENTS

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a method and an apparatus for providing a remote UI service, such as MMS and SMS, for controlling message-related functions of a remote UI server device, by using a remote UI client device.

The exemplary embodiments also provide a computer readable recording medium having recorded thereon a computer program for executing the method.

According to an aspect of the exemplary embodiments, there is provided a method by which a remote user interface (UI) client device provides a remote UI service, the method including the steps of receiving an event message, which includes a URL for accessing a first UI resource providing a UI notifying the receipt of a message, from a remote UI server device; obtaining the first UI resource from the remote UI server device by using the URL; receiving external inputs of message control commands via the first UI resource; and transmitting the message control command to the remote UI server device.

The message may include multimedia messaging service (MMS) messages and simple messaging service (SMS) messages.

The first UI resource may include a web page or bitmaps of an application and provides a UI which partially displays the content of the message and receives external inputs of message control commands for controlling the message.

The message control commands may include confirm commands, playback commands, stop commands, reply commands, forward commands, delete commands, save commands, and move commands, but are not limited thereto.

The method may further include obtaining a second UI resource providing a UI, which displays the complete content of the message, from the remote UI server device in the case where the control command is either a confirm or play back.

The method may further include obtaining a third UI resource providing a UI, which receives external inputs of texts and a control command for transmitting a message, from the remote UI server device; receiving external inputs of texts and the control command for transmitting a message by using the third UI resource; and transmitting the texts and the control command for transmitting the message to the remote UI server device, in the case where the control command is a reply.

The method may further include the steps of obtaining a fourth UI resource providing a UI, which displays a list of commonly used phrases and receives inputs of commands for selecting commonly used phrases, from the remote UI server device; receiving an external input of a command for selecting a commonly used phrase; and transmitting the command for selecting the commonly used phrase to the remote UI server device.

The method may further include obtaining a fifth UI resource providing a UI, which displays a list of telephone numbers and receives external inputs of commands for selecting telephone numbers, from the remote UI server device; receiving external inputs of the control command for selecting telephone number; and transmitting the control commands for selecting telephone numbers to the remote UI server device, in case where the control command is a forward command.

The method may further include a step of displaying the first UI resource.

The step of displaying the first UI resource may include displaying a web page by using a web browser or bitmaps of a UI application by using a bitmap browser.

The event message may be composed according to universal plug and play (UPnP) Remote UI or consumer electronics association (CEA) 2014 standards, but is not limited thereto, and the event message may be received via a unicast transmission or a multicast transmission.

According to another aspect of the exemplary embodiments, there is provided a method by which a remote user interface (UI) server device provides a remote UI service, the method including the steps of receiving a message from a message transmitting device; transmitting an event message, which includes a URL for accessing a first UI resource providing a UI notifying the receipt of the message, to a remote UI client device; transmitting the first UI resource to the remote UI client device by using the URL in response to a request form the remote UI client device; receiving a control command for controlling the message from the remote UI client device; and controlling the message by executing control functions related to the message.

The message includes multimedia messaging service (MMS) messages and simple messaging service (SMS) messages.

The first UI resource includes a web page or bitmaps of an application and provides a UI which partially displays the content of the message and receives external inputs of message control commands for controlling the message.

The message control commands include confirm commands, playback commands, stop commands, reply commands, forward commands, delete commands, save commands, and move commands, but are not limited thereto.

The method may further include a step of transmitting a second UI resource providing a UI, which displays the complete content of the message, to the remote UI client device, in the case where the control command is either a confirm command or a play back command.

The method may further include transmitting a third UI resource providing a UI, which receives external inputs of texts and a control command for transmitting a message, to the remote UI client device, in the case where the control command is a reply command.

The method may further include transmitting a fourth UI resource providing a UI, which displays a list of commonly used phrases and receives inputs of commands for selecting commonly used phrases, to the remote UI client device.

The method may further include transmitting a fifth UI resource providing a UI, which displays a list of telephone numbers and receives external inputs of commands for selecting telephone numbers, to the remote UI client device, in the case where the control command is a forward command.

The event message may be composed according to universal plug and play (UPnP) Remote UI or consumer electronics association (CEA) 2014 standards, but is not limited thereto, and the event message may be transmitted via a unicast transmission or a multicast transmission.

According to another aspect of the exemplary embodiments, there is provided a computer readable recording medium having recorded thereon a computer program for executing the method.

According to another aspect of the exemplary embodiments, there is provided a remote user interface (UI) client device including an event handler unit receiving an event message, which includes a URL for accessing a first UI resource providing a UI notifying the receipt of a message, from a remote UI server device; a UI resource obtaining unit obtaining the first UI resource from the remote UI server device by using the URL; a control command inputting unit receiving external inputs of message control commands via the first UI resource; and a control command transmitting unit transmitting the message control command to the remote UI server device.

According to another aspect of the exemplary embodiments, there is provided a remote user interface (UI) server device including a message receiving unit receiving a message from a message transmitting device; an event handler unit transmitting an event message, which includes a URL for accessing a first UI resource providing a UI notifying the receipt of the message, to a remote UI client device; a UI resource transmitting unit transmitting the first UI resource to the remote UI client device by using the URL in response to a request form the remote UI client device; and a control command receiving unit receiving a control command for controlling the message from the remote UI client device; and a control unit controlling the message.

BRIEF DESCRIPTION OF THE DRAWINGS

The above and other aspects of the exemplary embodiments will become more apparent by describing in detail exemplary embodiments thereof with reference to the attached drawings in which.

DETAILED DESCRIPTION OF THE EXEMPLARY EMBODIMENTS

Figure 1:
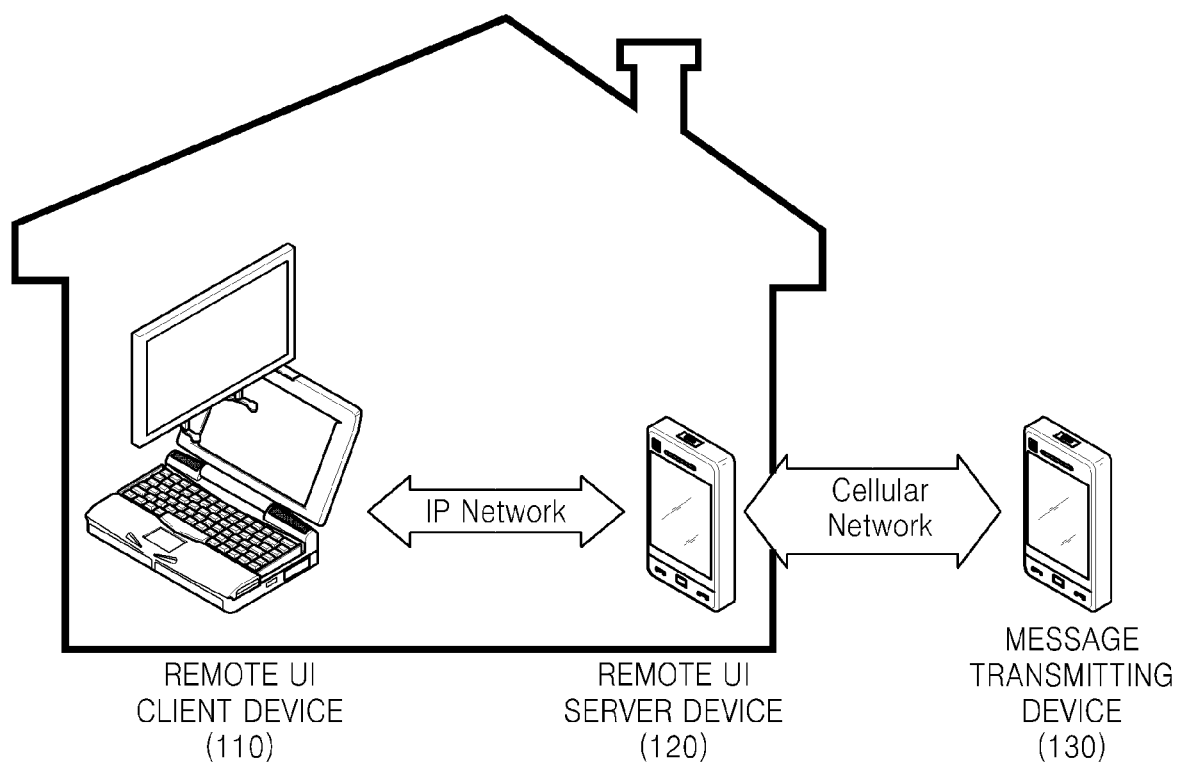
FIG. 1 is a diagram showing a method of providing a remote user interface (UI) service according to an exemplary embodiment.

The exemplary embodiments will now be described more fully with reference to the accompanying drawings, in which exemplary embodiments are shown. In the drawings, the thicknesses of layers and regions are exaggerated for clarity. Like reference numerals in the drawings denote like elements, and thus their description will be omitted.

FIG. 1 is a diagram showing a method of providing a remote user interface (UI) service according to an exemplary embodiment.

A remote UI server device 120 remotely provides a UI resource via a network. The UI resource provides a UI for notifying receipt of messages and for receiving external inputs of message control commands, and includes a web page or bitmaps of an application. A remote UI client device 110 receives notifications of messages and receives external inputs of message control commands via the UI resource provided by the remote UI server device 120. The remote UI client device 110 transmits input commands to the remote UI server device 120. Message control commands include confirm commands, playback commands, stop commands, reply commands, forward commands, delete commands, save commands, and move commands, but are not limited thereto. The remote UI server device 120 controls corresponding messages by using transmitted commands.

The remote UI server device 120 may be a device for receiving messages from a message transmitting device via a network including a cellular network and a data network. Examples of the remote UI server device 120 include a handheld phone and an IP phone, but this is not limited thereto. Examples of messages received by the remote UI server device 120 include multimedia messaging service (MMS) messages and simple messaging service (SMS) messages, but this is not limited thereto.

The remote UI client device 110 is a device including a display unit for displaying messages, and is a network-based device to which a user may easily input message control commands and texts. Examples of the remote UI client devices 110 include a DTV and a PC, but this is not limited thereto.

According to the present exemplary embodiment, messaging services of the remote UI server device 120 may be extended to other devices within a home network by enabling the remote UI client device 110 to use and control message-related functions including the MMS and the SMS.

Furthermore, the present exemplary embodiment provides a user convenience that a user may easily control message-related functions of the remote UI server device 120 by using the remote UI client device 110.

Figure 2:
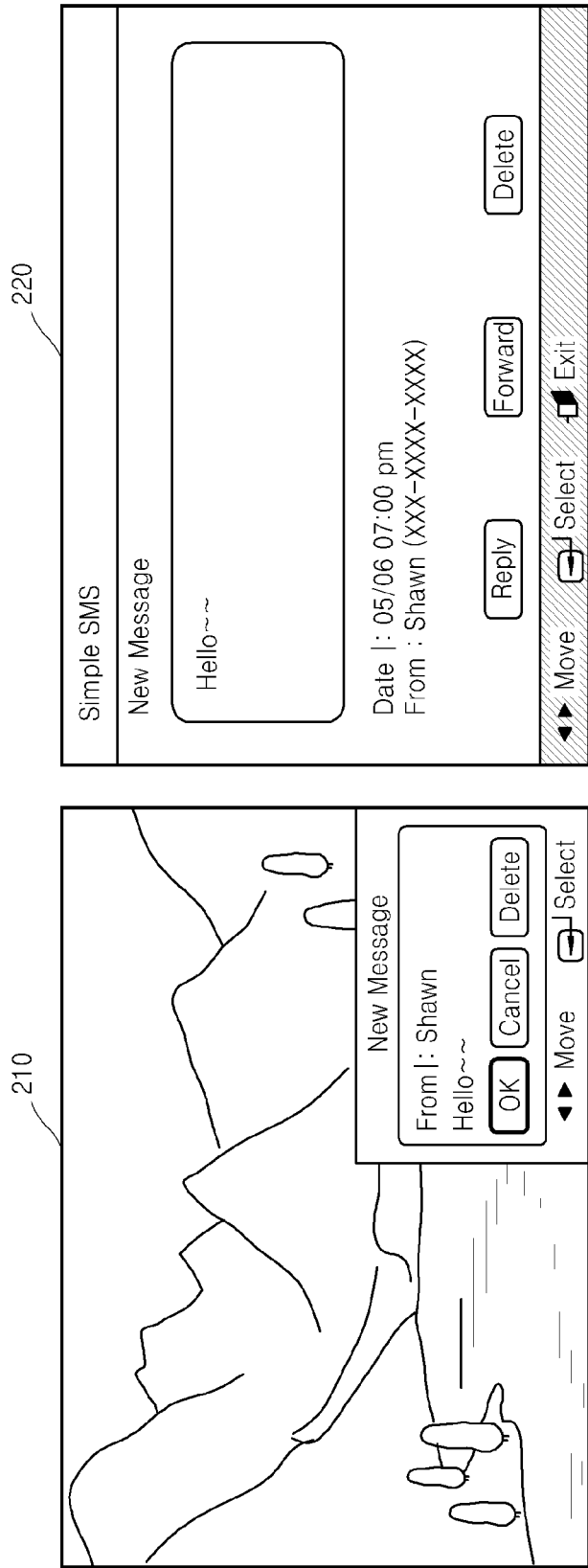
FIG. 2 is a diagram showing a UI resource providing a UI which notifies receipt of SMS messages, according to an exemplary embodiment.

FIG. 2 is a diagram showing a UI resource providing a UI which notifies receipt of SMS messages, according to an exemplary embodiment.

The remote UI server device 120, which received a SMS message, transmits an event message, which includes a uniform resource locator (URL) for accessing a UI resource providing a UI notifying the receipt of the message, to the remote UI client device 110.

The remote UI client device 110 obtains the UI resource from the remote UI server device 120 by using the URL. In the example shown in FIG. 2, the remote UI client device 110 obtains a UI resource providing a UI, which partially displays the content of the SMS message and receives external inputs of message control command for controlling the SMS message, from the remote UI server device 120 and displays the corresponding UI resource indicated by the reference numeral 210 in FIG. 2.

In the case where the remote UI client device 110 receives an external input of a message control command to confirm the message, the remote UI client device 110 transmits the message control command to confirm the message to the remote UI server device 120. Then, then remote UI client device 110 obtains a UI resource providing a UI, which displays the complete content of the SMS message, from the remote UI server device 120 and displays the corresponding UI resource indicated by the reference numeral 220 in FIG. 2.

Furthermore, although a UI for receiving SMS message control commands, such as reply, forward, delete, and save, may either be provided via the UI resource partially displaying the content of a SMS message or the UI resource displaying the complete content of the SMS message, it would have been obvious to one of ordinary skill in the art that the UI for receiving SMS message control commands, such as reply, forward, delete, and save, may be embodied otherwise.

Figure 3:
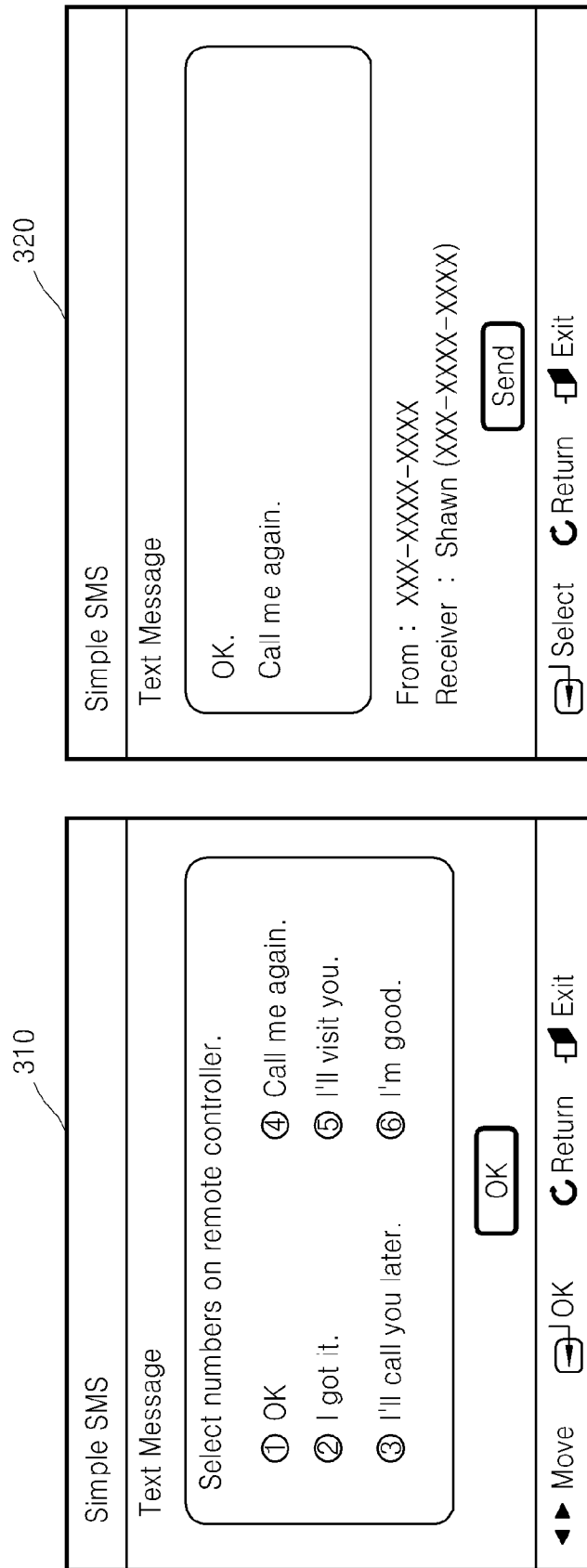
FIG. 3 is a diagram showing a UI resource providing a UI which replies received SMS messages, according to an exemplary embodiment.

FIG. 3 is a diagram showing a UI resource providing a UI which replies to received SMS messages, according to an exemplary embodiment.

In the case where the remote UI client device 110 receives an external input of a message control command to reply the message, the remote UI client device 110 transmits the message control command to reply the message to the remote UI server device 120. Then, the remote UI client device 110 obtains a UI resource providing a UI, which displays a list of commonly used phrases and receives inputs of commands for selecting commonly used phrases, from the remote UI server device 120 and displays the corresponding UI resource indicated by the reference numeral 310 in FIG. 3.

In the case where the remote UI client device 110 receives an external input of a command for selecting a commonly used phrase, the remote UI client device 110 transmits the command for selecting a commonly used phrase to the remote UI server device 120. Then, the remote UI client device 110 obtains a UI resource providing a UI, which displays selected commonly used phrases, from the remote UI server device 120, and displays the corresponding UI resource indicated by the reference numeral 320 in FIG. 3.

Figure 4:
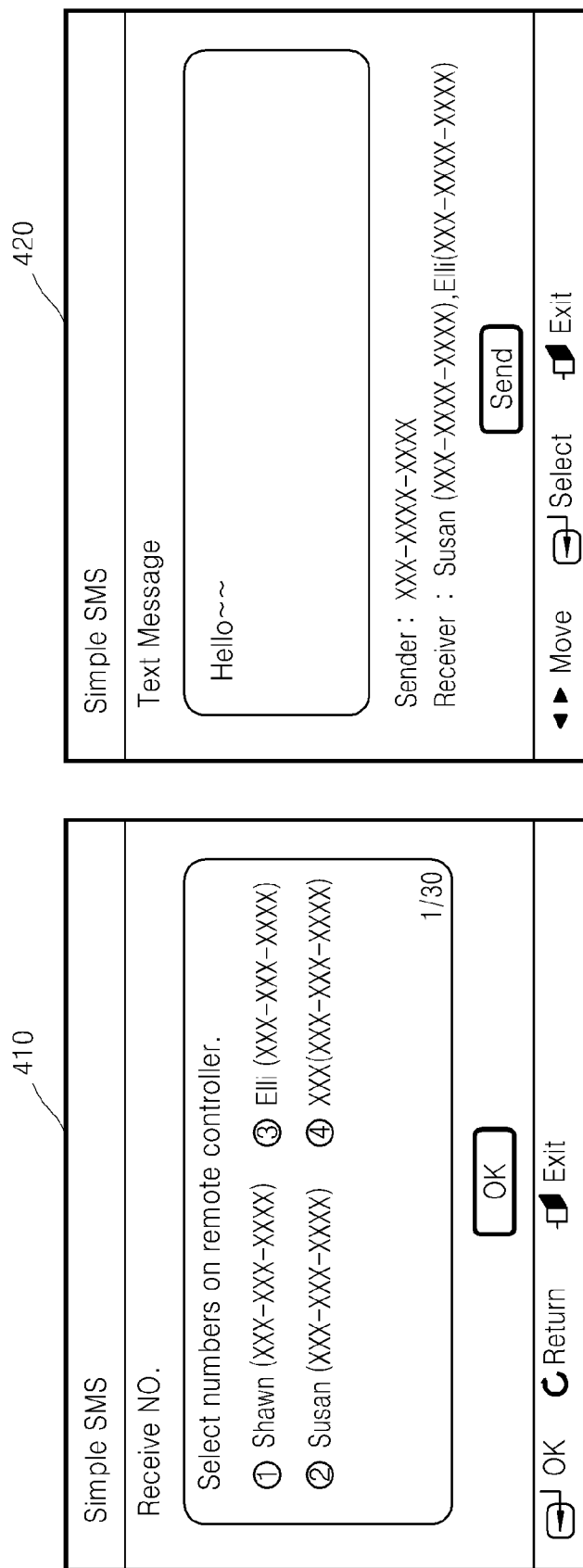
FIG. 4 is a diagram showing a UI resource providing a UI which forwards received SMS messages, according to an exemplary embodiment.

FIG. 4 is a diagram showing a UI resource providing a UI which forwards received SMS messages, according to an exemplary embodiment.

In the case where the remote UI client device 110 receives an external input of a message control command to forward the message, the remote UI client device 110 transmits the message control command to forward the message to the remote UI server device 120. Then, the remote UI client device 110 obtains a UI resource providing a UI, which displays a list of telephone numbers and users associated with each telephone number, and receives inputs of commands for selecting telephone numbers, from the remote UI server device 120, and displays the corresponding UI resource indicated by the reference numeral 410 in FIG. 4.

In the case where the remote UI client device 110 receives an external input of a command for selecting a telephone number, the remote UI client device 110 transmits the command for selecting a telephone number to the remote UI server device 120. Then, the remote UI client device 110 obtains a UI resource providing a UI, which displays selected telephone numbers, from the remote UI server device 120, and displays the corresponding UI resource indicated by the reference numeral 420 in FIG. 3.

Figure 5:
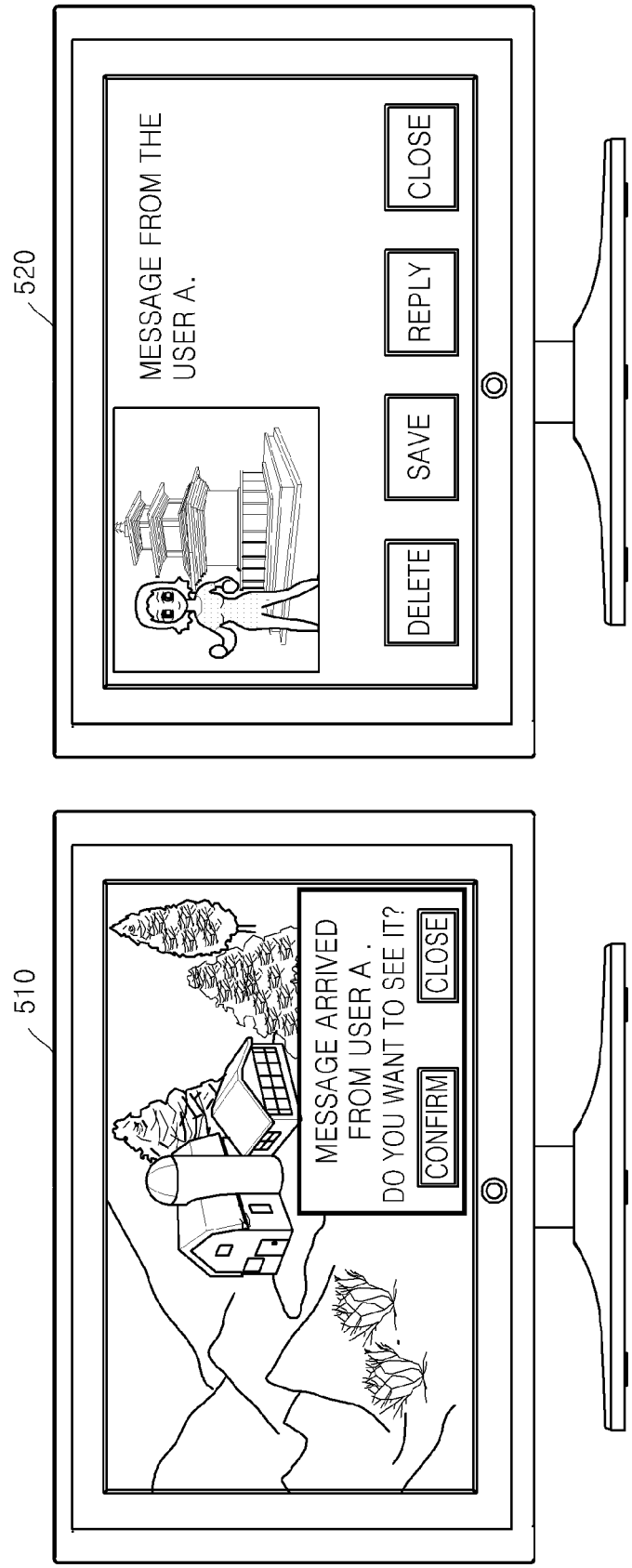
FIG. 5 is a diagram showing a UI resource providing a UI which notifies receipt of MMS messages, according to an exemplary embodiment.

FIG. 5 is a diagram showing a UI resource providing a UI which notifies receipt of MMS messages, according to an exemplary embodiment.

The remote UI server device 120, which received a MMS message, transmits an event message, which includes a URL for accessing a UI resource providing a UI, which notifying the receipt of the message, to the remote UI client device 110.

The remote UI client device 110 obtains the UI resource from the remote UI server device 120 by using the URL. In the example shown in FIG. 5, the remote UI client device 110 obtains a UI resource providing a UI, which displays information regarding the sender of the MMS message and receives external inputs of message control command for controlling the MMS message, from the remote UI server device 120 and displays the corresponding UI resource indicated by the reference numeral 510 in FIG. 5.

In case where the remote UI client device 110 receives an external input of a message control command to confirm the message, the remote UI client device 110 transmits the message control command to confirm the message to the remote UI server device 120. Then, then remote UI client device 110 obtains a UI resource providing a UI, which displays the complete content of the MMS message, from the remote UI server device 120 and displays the corresponding UI resource indicated by the reference numeral 520 in FIG. 5.

Furthermore, although a UI for receiving MMS message control commands, such as reply, forward, delete, and save, may be either provided via the UI resource displaying information regarding the sender of the MMS message or the UI resource displaying the complete content of the MMS message, it would have been obvious to one of ordinary skill in the art that the UI for receiving MMS message control commands, such as reply, forward, delete, and save, may be embodied otherwise.

Figure 6:
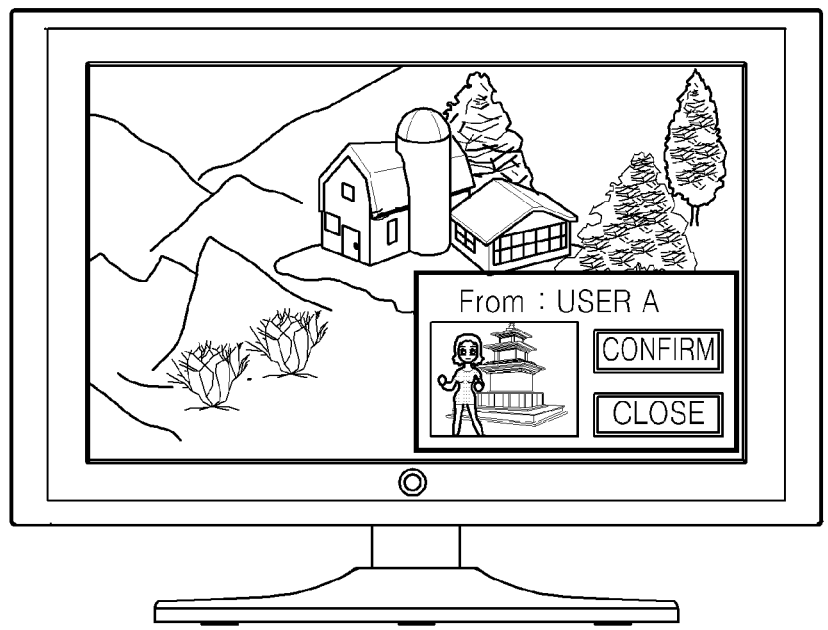
FIG. 6 is a diagram showing a UI resource providing a UI which notifies receipt of MMS messages, according to another exemplary embodiment.

FIG. 6 is a diagram showing a UI resource providing a UI which notifies receipt of MMS messages, according to another exemplary embodiment.

The remote UI server device 120, which received a MMS message, transmits an event message, which includes a URL for accessing a UI resource providing a UI, which notifies the receipt of the message, to the remote UI client device 110.

The remote UI client device 110 obtains the UI resource from the remote UI server device 120 by using the URL. In the example shown in FIG. 6, the remote UI client device 110 obtains a UI resource providing a UI, which partially displays the content of the MMS message and receives external inputs of message control command for controlling the MMS message, from the remote UI server device 120 and displays the corresponding UI resource indicated by the reference numeral 610 in FIG. 6.

In the case where the remote UI client device 110 receives an external input of a message control command to confirm the message, the remote UI client device 110 transmits the message control command to confirm the message to the remote UI server device 120. Then, the remote UI client device 110 obtains a UI resource providing a UI, which displays the complete content of the MMS message, from the remote UI server device 120 and displays the corresponding UI resource (not shown).

Furthermore, although a UI for receiving MMS message control commands, such as reply, forward, delete, and save, may be either provided via the UI resource partially displaying the content of the MMS message or the UI resource displaying the complete content of the MMS message, it would have been obvious to one of ordinary skill in the art that the UI for receiving MMS message control commands, such as reply, forward, delete, and save, may be embodied otherwise.

Figure 7:
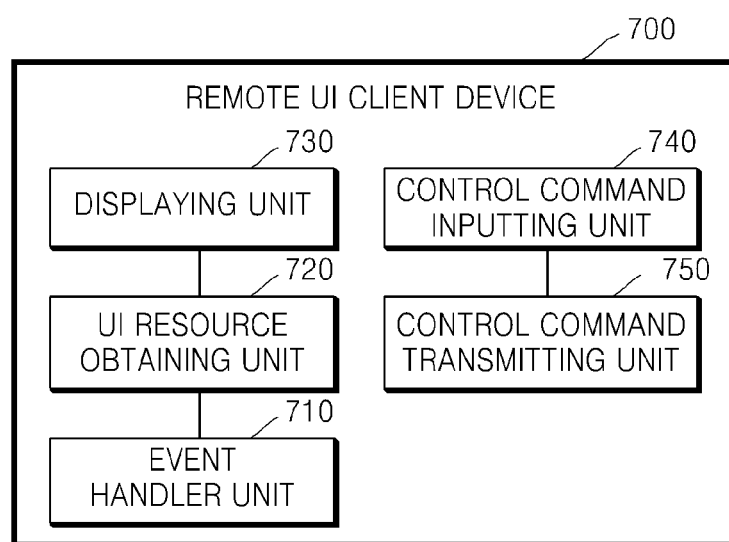
FIG. 7 is a block diagram showing the structure of a remote UI client device 700 according to an exemplary embodiment.

FIG. 7 is a block diagram showing the structure of a remote UI client device 700 according to an exemplary embodiment.

The remote UI client device 700 includes an event handler unit 710, a UI resource obtaining unit 720, a display unit 730, a control command inputting unit 740, and a control command transmitting unit 750.

In the case where the remote UI server device 800 receives a message, the event handler unit 710 receives an event message, which includes a URL for accessing a UI resource providing a UI notifying the receipt of the message, from a remote UI server device 800. Examples of the messages received by the remote UI server device 800 include MMS messages and SMS messages, but this is not limited thereto.

The UI resource partially displays the content of the message, provides a UI for receiving external inputs of message control commands, and includes a web page or bitmaps of an application.

An event message may be composed according to any of various home network standards, including universal plug and play (UPnP) Remote UI and consumer electronics association (CEA) 2014 standards, and is received via a unicast transmission or a multicast transmission.

The UI resource obtaining unit 720 obtains a UI resource from the remote UI server device 800 by using a URL. Protocols via which the UI resource obtaining unit 720 obtains a UI resource include extended remoting technology (XRT), remote desktop protocol (RDP), and hypertext transfer protocol (HTTP). However, it will be obvious to one of ordinary skill in the art that other protocols may also be used.

A capability matching unit (not shown) obtains capability information with respect to a UI resource from the remote UI server device 800. Capability information includes resolution information and codec information with respect to a UI resource. The UI resource obtaining unit 720 may obtain a UI resource that can be processed by the remote UI client device 700 with reference to capability information obtained by the capability matching unit.

Meanwhile, if a device (e.g., an UPnP control point device) acting as a negotiator between the remote UI server device 800 and the remote UI client device 700 exists, the capability matching unit transmits capability information with respect to a UI resource that can be processed by the remote UI client device 700 to the negotiating device. In this case, the capability matching unit obtains capability information negotiated between the remote UI server device 800 and the remote UI client device 700 from the negotiating device. The UI resource obtaining unit 720 may obtain a UI resource that can be processed by the remote UI client device 700 with reference to the negotiated capability information obtained by the capability matching unit.

The display unit 730 displays a UI resource. The display unit 730 displays either a web page by using a web browser or bitmaps of a UI application by using a bitmap browser.

The control command inputting unit 740 receives external inputs of message control commands via a UI resource. Message control commands includes confirm commands, playback commands, stop commands, reply commands, forward commands, delete commands, save commands, and move commands, but are not limited thereto. The control command inputting unit 740 receives the external inputs of message control commands via a web page or an application with a message control command inputting interface.

The control command transmitting unit 750 transmits an externally input control command to the remote UI server device 800 by using a UI resource. The control command transmitting unit 750 may use either the same session as a session for obtaining a UI resource, or an asynchronous session independent from the session for obtaining the UI resource. An asynchronous session may be embodied by using asynchronous JavaScript and XML (AJAX). However, it will be obvious to one of ordinary skill in the art that an asynchronous session may be embodied by using any of various other methods. AJAX refers to a web developing technique for authoring a communicative web application and is capable of exchanging and manipulating data asynchronously with a web server. Detailed descriptions of AJAX are omitted here.

In the case where a control command transmitted by the control command transmitting unit 750 is either a control command to confirm a message or a control message to play back a message, the UI resource obtaining unit 720 obtains a UI resource providing a UI, which displays the complete content of the message, from the remote UI server device 800.

In the case where a control command transmitted by the control command transmitting unit 750 is a control command to reply to the message, the UI resource obtaining unit 720 obtains a UI resource providing a UI, which receives external inputs of texts and a control command for transmitting a message, from the remote UI server device 800. The control command inputting unit 740 receives external inputs of texts and a control command for transmitting a message. The control command transmitting unit 750 transmits the texts and the control command for transmitting the message to the remote UI server device 800.

Meanwhile, the texts may include commonly used phrases. Thus, the UI resource obtaining unit 720 obtains a UI resource providing a UI, which displays a list of commonly used phrases and receives inputs of commands for selecting commonly used phrases, from the remote UI server device 800. The control command inputting unit 740 receives an external input of a command for selecting a commonly used phrase. The control command transmitting unit 750 transmits the command for selecting a commonly used phrase to the remote UI server device 800. The UI resource obtaining unit 720 obtains a UI resource providing a UI, which displays reply texts including selected commonly used phrases, from the remote UI server device 800.

In the case where a control command transmitted by the control command transmitting unit 750 is a control command to forward the message, the UI resource obtaining unit 720 obtains a UI resource providing a UI, which displays a list of telephone numbers and associated users, and receives external inputs of commands for selecting telephone numbers, from the remote UI server device 800. The control command inputting unit 740 receives external inputs of the control command for selecting telephone numbers. The control command transmitting unit 750 transmits the control commands for selecting telephone numbers to the remote UI server device 800. The UI resource obtaining unit 720 obtains a UI resource providing a UI, which displays selected telephone numbers and reply texts, from the remote UI server device 800.

Figure 8:
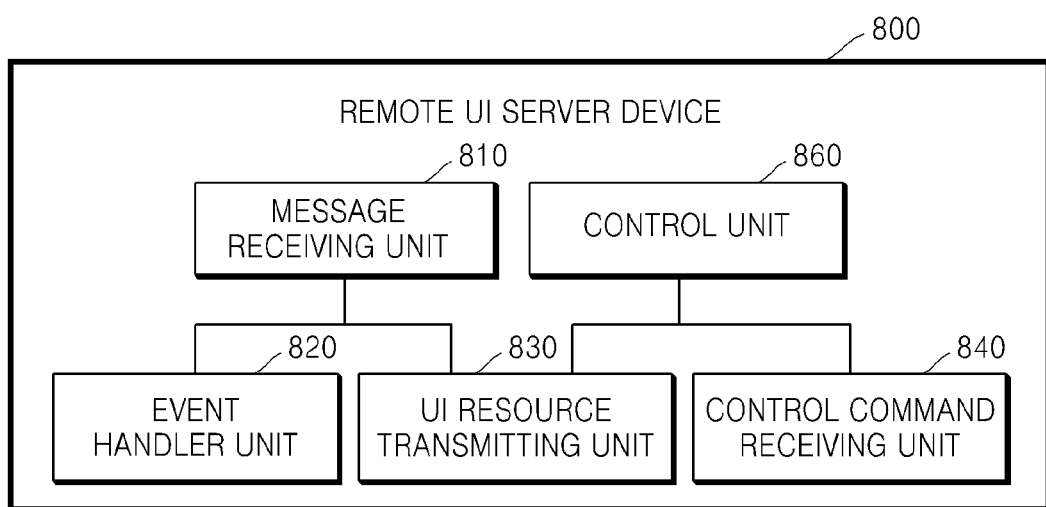
FIG. 8 is a block diagram showing the structure of the remote UI server device 800 according to an exemplary embodiment.

FIG. 8 is a block diagram showing the structure of the remote UI server device 800 according to an exemplary embodiment.

The remote UI server device 800 includes a message receiving unit 810, an event handler unit 820, a UI resource transmitting unit 830, a control command receiving unit 840, and a control unit 860.

The message receiving unit 810 receives messages from a message transmitting device via a cellular network, including a global system for mobile communication (GSM) network and a code division multiple access (CDMA) network. Examples of the messages received by the message receiving unit 810 include MMS messages and SMS messages, but are not limited thereto.

The event handler unit 820 transmits an event message, which includes a URL for accessing a UI resource providing a UI notifying the receipt of a message, to a remote UI client device 700.

The UI resource transmitting unit 830 transmits a UI resource to the remote UI client device 700 in response to a request from the remote UI client device 700. Protocols via which the UI resource transmitting unit 830 transmits a UI resource include XRT, RDP, and HTTP. However, it will be obvious to one of ordinary skill in the art that other protocols may also be used.

A capability matching unit (not shown) transmits capability information with respect to a UI resource to the remote UI client device 700. Capability information includes resolution information and codec information with respect to a UI resource. The remote UI client device 700 may obtain a UI resource that can be processed by the remote UI client device 700 with reference to capability information obtained by the capability matching unit.

Meanwhile, if a device (e.g., an UPnP control point device) acting as a negotiator between the remote UI server device 800 and the remote UI client device 700 exists, the capability matching unit transmits capability information with respect to a UI resource to the negotiating device. In this case, the capability matching unit obtains capability information negotiated between the remote UI server device 800 and the remote UI client device 700 from the negotiating device. The UI resource transmitting unit 830 may transmit a UI resource that can be processed by the remote UI client device 700 with reference to the negotiated capability information obtained by the capability matching unit.

Meanwhile, an event message may be composed according to any of various home network standards, including universal plug and play (UPnP) Remote UI and consumer electronics association (CEA) 2014 standards, and is received via a unicast transmission or a multicast transmission.

The control command receiving unit 840 receives external inputs of control commands from the remote UI client device 700. The control command receiving unit 840 may use either the same session as a session for transmitting a UI resource or an asynchronous session independent from the session for transmitting the UI resource. An asynchronous session may be embodied by using AJAX. However, it will be obvious to one of ordinary skill in the art that an asynchronous session may be embodied by using any of various other methods. The control commands include confirm commands, playback commands, stop commands, reply commands, forward commands, delete commands, save commands, and move commands, but are not limited thereto. The control command inputting unit 740 receives the external inputs of message control commands via a web page or an application with a message control command inputting interface.

A control unit 860 executes control functions related to corresponding messages.

In the case where a control command received by the control command receiving unit 840 is either a control command to confirm a message or a control message to play back a message, the UI resource transmitting unit 830 transmits a UI resource providing a UI, which displays the complete content of the message, to the remote UI client device 700.

In the case where a control command received by the control command receiving unit 840 is a control command to reply to the message, the UI resource transmitting unit 830 transmits a UI resource providing a UI, which receives external inputs of texts and a control command for transmitting a message, to the remote UI client device 700.

Meanwhile, the texts may include commonly used phrases. Thus, the UI resource transmitting unit 830 transmits a UI resource providing a UI, which displays a list of commonly used phrases and receives inputs of commands for selecting commonly used phrases, to the remote UI client device 700.

In the case where a control command received by the control command receiving unit 840 is a control command to forward the message, the UI resource transmitting unit 830 transmits a UI resource providing a UI, which displays a list of telephone numbers and associated users of the telephone numbers, and receives external inputs of commands for selecting telephone numbers, to the remote UI client device 700.

Figure 9:
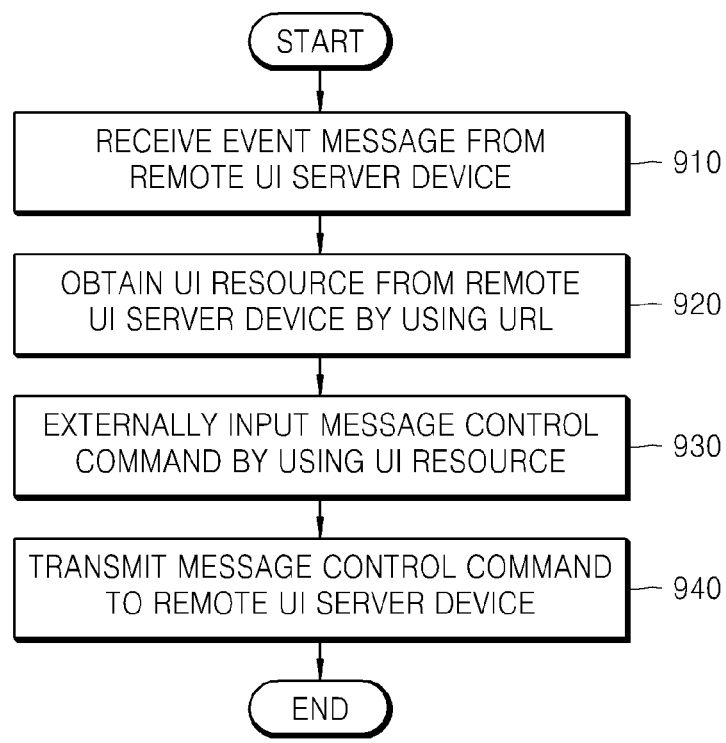
FIG. 9 is a flowchart of the process through which the remote UI client device 700 provides a remote UI service, according to an exemplary embodiment.

FIG. 9 is a flowchart of the process through which the remote UI client device 700 provides a remote UI service, according to an exemplary embodiment.

In operation 910, in the case where the remote UI server device 800 receives a message, the remote UI client device 700 receives an event message, which includes a URL for accessing a UI resource providing a UI notifying the receipt of the message, from a remote UI server device 800.

In operation 920, the remote UI client device 700 obtains a UI resource from the remote UI server device 800 by using a URL.

In operation 930, the remote UI client device 700 receives external inputs of message control commands via a UI resource. Message control commands include confirm commands, playback commands, stop commands, reply commands, forward commands, delete commands, save commands, and move commands, but are not limited thereto. The remote UI client device 700 receives the external inputs of message control commands via a web page or an application with a message control command inputting interface.

In operation 940, the remote UI client device 700 transmits an externally input control command to the remote UI server device 800 by using a UI resource.

In the operation 940, in the case where a control command transmitted by the remote UI client device 700 is either a control command to confirm a message or a control message to play back a message, the remote UI client device 700 obtains a UI resource providing a UI, which displays the complete content of the message, from the remote UI server device 800 (not shown in FIG. 9).

In the operation 940, in the case where a control command transmitted by the remote UI client device 700 is a control command to reply to the message, the remote UT client device 700 obtains a UI resource providing a UI, which receives external inputs of texts and a control command for transmitting a message, from the remote UI server device 800 (not shown in FIG. 9). The remote UI client device 700 receives external inputs of texts and a control command for transmitting a message by using the UI resource. The remote UI client device 700 transmits the texts and the control command for transmitting the message to the remote UI server device 800 (not shown in FIG. 9).

Meanwhile, the texts may include commonly used phrases. Thus, the remote UI client device 700 obtains a UI resource providing a UT, which displays a list of commonly used phrases and receives inputs of commands for selecting commonly used phrases, from the remote UI server device 800 (not shown in FIG. 9). The remote UI client device 700 receives an external input of a command for selecting a commonly used phrase (not shown in FIG. 9). The remote UI client device 700 transmits the command for selecting a commonly used phrase to the remote UI server device 800 (not shown in FIG. 9). The UI resource obtaining unit 720 obtains a UI resource providing a UI, which displays reply texts including selected commonly used phrases, from the remote UI server device 800 (not shown in FIG. 9).

In the operation 940, in the case where a control command transmitted by the remote UI client device 700 is a control command to forward the message, the remote UI client device 700 obtains a UI resource providing a UI, which displays a list of telephone numbers, and associated users of the telephone numbers, and receives external inputs of commands for selecting telephone numbers, from the remote UI server device 800 (not shown in FIG. 9). The remote UI client device 700 receives external inputs of the control command for selecting telephone number (not shown in FIG. 9). The remote UI client device 700 transmits the control commands for selecting telephone numbers to the remote UI server device 800 (not shown in FIG. 9). The remote UI client device 700 obtains a UI resource providing a UI, which displays selected telephone numbers and reply texts, from the remote UI server device 800 (not shown in FIG. 9).

Figure 10:
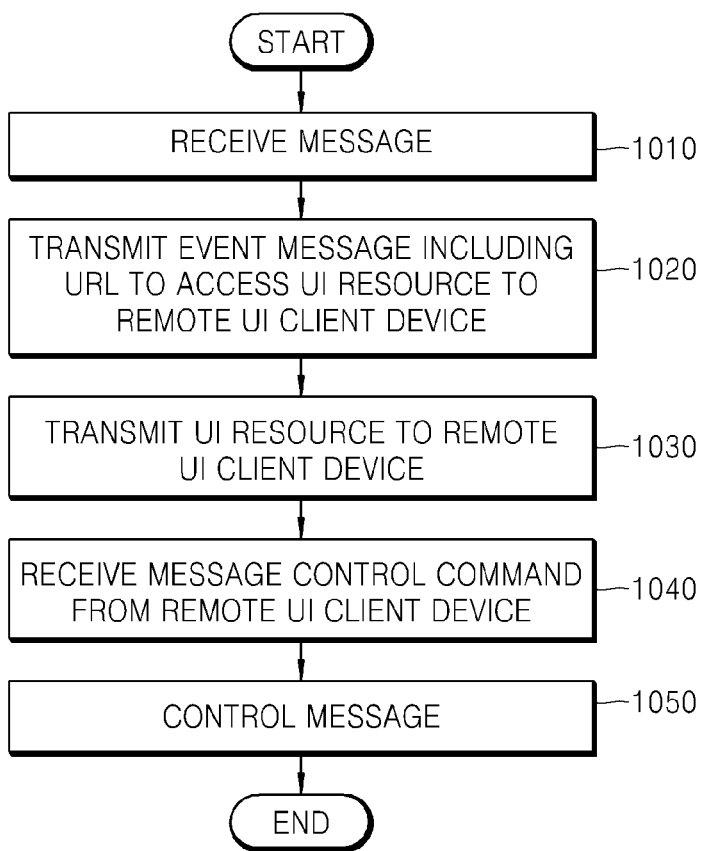
FIG. 10 is a flowchart of the process through which a remote UI server device provides a remote UI service, according to an exemplary embodiment.

FIG. 10 is a flowchart of the process through which the remote UI server device 800 provides a remote UI service, according to an exemplary embodiment.

In an operation 1010, the remote UI server device 800 receives messages from a message transmitting device via a cellular network, including a GSM network and a CDMA network. Examples of the messages received by the remote UI server device 800 include MMS messages and SMS messages, but are not limited thereto.

In an operation 1020, the remote UI server device 800 transmits an event message, which includes a URL for accessing a UI resource providing a UI notifying the receipt of a message, to a remote UI client device 700.

In an operation 1030, the remote UI server device 800 transmits a UI resource to the remote UI client device 700 in response to a request from the remote UI client device 700.

In an operation 1040, the remote UI server device 800 receives external inputs of control commands from the remote UI client device 700. The control commands include confirm commands, playback commands, stop commands, reply commands, forward commands, delete commands, save commands, and move commands, but are not limited thereto.

In an operation 1050, the remote UI server device 800 executes control functions related to corresponding messages.

In the operation 1040, in the case where a control command received by the remote UI server device 800 is either a control command to confirm a message or a control message to play back a message, the remote UI server device 800 transmits a UI resource providing a UI, which displays the complete content of the message, to the remote UI client device 700 (not shown in FIG. 10).

In the operation 1040, in the case where a control command received by the remote UI server device 800 is a control command to reply to the message, the remote UI server device 800 transmits a UI resource providing a UI, which receives external inputs of texts and a control command for transmitting a message, to the remote UI client device 700 (not shown in FIG. 10).

Meanwhile, the texts may include commonly used phrases. Thus, the remote UI server device 800 transmits a UI resource providing a UI, which displays a list of commonly used phrases and receives inputs of commands for selecting commonly used phrases, to the remote UI client device 700.

In the operation 1040, in case where a control command received by the remote UI server device 800 is a control command to forward the message, the remote UI server device 800 transmits a UI resource providing a UI, which displays a list of telephone numbers, and associated users of the telephone numbers, and receives external inputs of commands for selecting telephone numbers, to the remote UI client device 700.

While the exemplary embodiments have been particularly shown and described with reference to exemplary embodiments thereof, it will be understood by those of ordinary skill in the art that various changes in form and details may be made therein without departing from the spirit and scope of the exemplary embodiments as defined by the following claims.

For example, each of the remote UI client device 700 and the remote UI server device 800 according to exemplary embodiments may include a bus coupled with each of components, at least one processor coupled with the bus, and a memory, which is coupled to the bus to store commands, received messages, or generated messages and is coupled with the at least one processor to perform the commands described above.

The exemplary embodiments may be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

The invention may also be embodied in other exemplary embodiments as computer readable codes on a computer readable transmission medium which may include carrier waves (such as data transmission through the Internet).

Further, expressions such as at least one of, when preceding a list of elements, modify the entire list of elements and do not modify the individual elements of the list.

What is claimed is:

1. A method performed by an electronic device, the method comprising:
   receiving, via a first wireless communication interface of the electronic device, preset text information from a first external device, the preset text information corresponding to a preset text stored in the first external device;
   receiving, from the first external device via the first wireless communication interface, message information related to a message originated from a second external device and received by the first external device, the message information including identification information related to the second external device;
   displaying, on a display of the electronic device, the message information received from the first external device;
   displaying, on the display of the electronic device, the preset text information based on a first input, wherein the preset text information is displayed together with the identification information related to the second external device included in the message information on the display of the electronic device;
   selecting, based on a second input, the displayed preset text information; and
   based on selecting the preset text information, transmitting, to the first external device via the first wireless communication interface, the preset text information as a response to the message information such that a response message, based on the preset text information, to the message is transmitted from the first external device toward the second external device.

2. The method of claim 1, wherein the preset text information includes a plurality of preset texts stored in the first external device.

3. The method of claim 2, wherein the displaying the message information comprises displaying the plurality of preset texts, and
   wherein the selecting the displayed preset text information comprises selecting one of the plurality of preset texts, based on the second input.

4. The method of claim 1, wherein the identification information related to the second external device comprises at least one of a phone number of the second external device or a name of a user of the second external device.

5. The method of claim 1, wherein the first wireless communication interface of the electronic device is configured to communicate with the first external device through a short-range wireless communication.

6. An electronic device comprising:
   a display;
   a first wireless communication interface configured to communicate with a first external device; and
   a processor configured to:
   receive, via the first wireless communication interface of the electronic device, preset text information from the first external device, the preset text information corresponding to a preset text stored in the first external device,
   receive, from the first external device via the first wireless communication interface, message information related to a message originated from a second external device and received by the first external device, the message information including identification information related to the second external device,
   display, on the display of the electronic device, the message information received from the first external device,
   display, on the display of the electronic device, the preset text information based on a first input, wherein the preset text information is displayed together with the identification information related to the second external device included in the message information on the display of the electronic device,
   select, based on a second input, the displayed preset text information, and
   based on selecting the preset text information, transmit, to the first external device via the first wireless communication interface, the preset text information as a response to the message information such that a response message, based on the preset text information, to the message is transmitted from the first external device toward the second external device.

7. The electronic device of claim 6, wherein the preset text information includes a plurality of preset texts stored in the first external device.

8. The electronic device of claim 7, wherein the processor is configured to:
   display the plurality of preset texts on the display of the electronic device, and
   select one of the plurality of preset texts, based on the second input.

9. The electronic device of claim 6, wherein the identification information related to the second external device comprises at least one of a phone number of the second external device or a name of a user of the second external device.

10. The electronic device of claim 6, wherein the first wireless communication interface is configured to communicate with the first external device through a short-range wireless communication.

11. A non-transitory computer-readable recording medium having stored thereon instructions which, when executed by an electronic device, cause the electronic device to perform a method including:
- receiving, via a first wireless communication interface of the electronic device, preset text information from a first external device, the preset text information corresponding to a preset text stored in the first external device;
- receiving, from the first external device via the first wireless communication interface, message information related to a message originated from a second external device and received by the first external device, the message information including identification information related to the second external device;
- displaying, on a display of the electronic device, the message information received from the first external device;
- displaying, on the display of the electronic device, the preset text information based on a first input, wherein the preset text information is displayed together with the identification information related to the second external device included in the message information on the display of the electronic device;
- selecting, based on a second input, the displayed preset text information; and
- based on selecting the preset text information, transmitting, to the first external device via the first wireless communication interface, the preset text information as a response to the message information such that a response message, based on the preset text information, to the message is transmitted from the first external device toward the second external device.

12. The non-transitory computer-readable recording medium of claim 11, wherein the preset text information includes a plurality of preset texts stored in the first external device.

13. The non-transitory computer-readable recording medium of claim 12, wherein the displaying the message information comprises displaying the plurality of preset texts, and
- wherein the selecting the displayed preset text information comprises selecting one of the plurality of preset texts, based on the second input.

14. The non-transitory computer-readable recording medium of claim 12, wherein the identification information related to the second external device comprises at least one of a phone number of the second external device or a name of a user of the second external device.

15. The non-transitory computer-readable recording medium of claim 12, wherein the first wireless communication interface of the electronic device is configured to communicate with the first external device through a short-range wireless communication.

* * * * *